(12) United States Patent
Park

(10) Patent No.: US 12,358,484 B2
(45) Date of Patent: Jul. 15, 2025

(54) VEHICLE BRAKE APPARATUS

(71) Applicant: HYUNDAI MOBIS CO., LTD., Seoul (KR)

(72) Inventor: Si Yoon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/366,759

(22) Filed: Aug. 8, 2023

(65) Prior Publication Data

US 2024/0140388 A1    May 2, 2024

(30) Foreign Application Priority Data

Oct. 26, 2022    (KR) .......................... 10-2022-0139680

(51) Int. Cl.
| | | |
|---|---|---|
| *B60T 13/74* | (2006.01) | |
| *B60T 13/16* | (2006.01) | |
| *F15B 15/14* | (2006.01) | |
| *F16J 10/04* | (2006.01) | |

(52) U.S. Cl.
CPC ............ *B60T 13/745* (2013.01); *B60T 13/16* (2013.01); *F15B 15/1447* (2013.01); *F16J 10/04* (2013.01); *F15B 2015/1495* (2013.01)

(58) Field of Classification Search
CPC .......... B60T 13/16; B60T 13/745; F16J 10/04
See application file for complete search history.

(56) References Cited

U.S. PATENT DOCUMENTS

| | | | | |
|---|---|---|---|---|
| 6,053,289 | A * | 4/2000 | Bauer .................... | F16D 65/567 188/71.9 |
| 8,997,947 | B2 * | 4/2015 | Shiraki ................... | F16D 65/38 188/156 |
| 10,295,004 | B2 * | 5/2019 | Chelaidite ............... | F16D 65/12 |
| 10,875,516 | B2 * | 12/2020 | Lee ........................ | B60T 13/745 |
| 11,999,327 | B2 * | 6/2024 | Park ....................... | B60T 13/745 |
| 2012/0017756 | A1 * | 1/2012 | Bidare .................. | F03G 7/0254 92/3 |
| 2018/0009425 | A1 * | 1/2018 | Feigel ................... | B60T 13/145 |
| 2023/0415719 | A1 * | 12/2023 | Choi ..................... | B60T 13/745 |
| 2024/0149852 | A1 * | 5/2024 | Park ........................ | F15B 15/14 |

FOREIGN PATENT DOCUMENTS

| | | | | |
|---|---|---|---|---|
| DE | 102019219409 A1 * | 6/2021 | ............ | B60T 13/745 |
| KR | 10-2020-0066704 A | 6/2020 | | |

OTHER PUBLICATIONS

DE102019219409A1_t machine translation thereof (Year: 2021).*

* cited by examiner

*Primary Examiner* — Matthew Wiblin
(74) *Attorney, Agent, or Firm* — NovoTechIP International PLLC

(57) ABSTRACT

A vehicle brake apparatus is provided including a housing, a cylinder installed inside the housing, a motor connected to the cylinder and configured to provide a rotational force to a screw shaft installed inside the cylinder to axially rotate the screw shaft by providing the screw shaft with the rotational force of the motor, a nut coupled to the screw shaft with a ball member in between and reciprocating along an axial direction of the screw shaft in a manner that corresponds to a rotational direction of the screw shaft, a piston coupled to the nut and moving in unison with the nut, and a retaining portion installed between the nut and the piston and having an opening.

20 Claims, 11 Drawing Sheets

VEHICLE BRAKE APPARATUS

CROSS-REFERENCE TO RELATED APPLICATIONS

This application claims the benefit under 35 U.S.C. § 119(a) of priority to Korean Patent Application No. 10-2022-0139680, filed on Oct. 26, 2022 in the Korean Intellectual Property Office, the entire disclosure of which is incorporated herein by reference for all purposes.

TECHNICAL FIELD

Exemplary embodiments of the present disclosure relate to a vehicle brake apparatus and, more particularly, to a vehicle brake apparatus capable of converting a rotational motion of a screw supplied with a rotational force of a motor into a straight-line motion of a piston.

BACKGROUND

Usually, characteristics of an electric vehicle brake system require it to use an apparatus that generates braking fluid pressure by converting a rotational motion of a motor into a straight-line motion of a piston inside a cylinder.

For the electric brake apparatus, a ball-screw apparatus is used as the apparatus for converting the rotational motion of the motor into the straight-line motion. The ball-screw apparatus includes a screw shaft axially rotates by being supplied with a rotational force of the motor, a nut that is coupled to the screw shaft with a ball in between and moves in the axial direction of the screw shaft, and a piston that is coupled to the nut and presses against an operating fluid inside the cylinder.

In the related art, the ball-screw apparatus rotates in forward and reverse directions in response to switching between directions of the rotational force produced by the motor and thus reciprocates. As a result, the coupling of the nut and the piston may be problematically loosened when the ball-screw apparatus switches to the direction for reciprocating in a straight line.

In addition, in the related art, the motor supports an axial load that is produced due to a reaction force resulting from generating hydraulic pressure inside the cylinder. To ensure adequate rigidity for the motor to support the axial load, it becomes necessary to increase the size and weight of both a motor housing and a bearing, which presents a problematic challenge.

The related art of the present disclosure is disclosed in Korean Patent Application Publication No. 10-2020-0066704 (published on Jun. 10, 2022 and entitled "Integrated Hydraulic Module of an Electro-hydraulic Servo Brake").

SUMMARY

Various embodiments are directed to a vehicle brake apparatus capable of preventing coupling of a nut and a piston from being loosened.

Moreover, various embodiments are directed to a vehicle brake apparatus capable of guiding straight-line movement of a nut coupled to a screw with a ball in between.

Moreover, various embodiments are directed to a vehicle brake apparatus capable of bidirectionally supporting an axial load produced by a reaction force resulting from generating hydraulic pressure, through a bearing coupled to a cylinder.

Moreover, various embodiments are directed to a vehicle brake apparatus capable of not transferring an axial load produced by hydraulic pressure to a motor through a bearing coupled to a cylinder.

Moreover, various embodiments are directed to a vehicle brake apparatus capable of omitting an existing single component for assembling in an axially manner, by adjusting perpendicularity and concentricity using space in the bearing itself.

In an embodiment of the present disclosure, a vehicle brake apparatus includes: a housing; a cylinder installed inside the housing; a motor connected to the cylinder and configured to provide a rotational force; a screw shaft installed inside the cylinder and axially rotating by being provided with the rotational force of the motor; a nut coupled to the screw shaft with a ball member in between and reciprocating along an axial direction of the screw shaft in a manner that corresponds to a rotational direction of the screw shaft; a piston coupled to the nut and moving in unison with the nut; and a retaining portion installed between the nut and the piston and having an opening.

The vehicle brake apparatus may further include a sleeve provided inside the cylinder and guiding movement of the piston inserted into the sleeve.

A port through which operating oil flows may be formed in an outer surface of the cylinder, and a cut-off hole that communicates with the port may be formed in an outer surface of the sleeve.

The cylinder may generate hydraulic pressure for double-acting operation as the piston reciprocates.

The piston may include: a rod coupled to an outer surface of the nut in a nut-and-bolt fastening manner; and a head integrally formed with the rod and reciprocating inside the sleeve along a lengthwise direction of the sleeve.

The vehicle brake apparatus may further include a bearing provided inside the cylinder, coupled to the screw shaft, and supporting an axial load when hydraulic pressure is generated inside the cylinder generates.

The motor may include: a stationary unit fixed to the housing and producing a varying magnetic force when supplied with electric power; a motor rotation unit connected to the screw shaft and rotating in unison with the screw shaft, but in response to a change in the magnetic force produced by the stationary unit; and a motor bearing installed between the stationary unit and the motor rotation unit and reducing friction that occurs when the motor rotation unit rotates.

The motor rotation unit may include: a rotational frame rotatably installed inside the stationary unit and installed in a manner that surrounds one side of the cylinder; and a rotor installed on an outer surface of the stationary unit that faces the rotational frame and rotating in response to the magnetic force.

The screw shaft may include: a body rotatably installed inside the cylinder, an outer surface of the body being externally threaded; a first coupling unit extending from one side of the body and spline-coupled to the rotational frame; and a second coupling unit extending from the other side of the body and rotatably coupled to the bearing.

The retaining portion may be in the shape of a ring, with one side open.

A first groove may be formed in an outer surface of the nut by recessing the outer surface thereof, in such a manner as to accommodate one part of the retaining portion, and a second groove may be formed in an inner surface of the piston by recessing the inner surface thereof, in such a manner as to correspond to the first groove and to accommodate the remaining parts of the retaining portion.

The vehicle brake apparatus may further include a guide provided inside the cylinder, restricting rotation of the nut, and guiding straight-line movement of the nut.

The guide may include a guide member inserted between the cylinder and the nut.

The guide may include: a first guide groove formed in an inner surface of the cylinder by recessing the inner surface thereof; and a second guide groove formed in an outer surface of the nut in such a manner as to correspond to the first guide groove, and the guide member may be positioned between the first guide groove and the second guide groove.

The vehicle brake apparatus may further include a support protrusion protrusively formed on the inner surface of the cylinder and supporting on one end portion of the guide member, wherein the support protrusion may be positioned on one end portion of the first guide groove.

The vehicle brake apparatus may further include a flange provided on a one end of the nut, wherein the second guide groove and formed in an outer surface of the flange, and wherein the flange may move in a straight line along the guide member.

The nut and the flange may be integrally formed into one piece.

The guide may be integrally formed with the cylinder or the nut.

The guide may include: a first guide protrusion protrusively formed on an inner surface of the cylinder; and a third guide groove formed in an outer surface of the nut by recessing the outer surface thereof, in such a manner as to correspond to the first guide protrusion, and the nut may move in a straight line along the first guide protrusion.

The guide may include: a fourth guide groove formed in the inner surface of the cylinder by recessing the inner surface thereof; and a second guide protrusion protrusively formed on the outer surface of the nut in such a manner as to correspond to the fourth guide groove, and the nut may move in a straight line along the fourth groove.

According to the present disclosure, the effect of preventing the coupling of the nut and the piston in a nut-and-bolt fastening manner from being loosened, through a configuration of the retaining portion installed between the nut and the piston can be achieved.

In addition, according to the present disclosure, the rotational motion of the screw shaft can be converted into the straight-line movement of the piston through a configuration of the guide that restricts the rotation of the nut moving along the screw shaft and guides the straight-line movement of the nut. As a result, the effect of reducing a manufacturing cost and improving NVH performance can be achieved.

In addition, according to the present disclosure, the axial load produced by the reaction force resulting from generating the hydraulic pressure can be bidirectionally supported through the bearing coupled to the cylinder. As a result, the effect of not transferring the axial load produced by the hydraulic pressure to the motor can be achieved.

In addition, according to the present disclosure, the motor does not support the axial load. As a result, the effect of reducing the weight and size of both the housing and bearing can be achieved.

In addition, according to the present disclosure, an existing single component for assembling in an axial manner can be omitted by adjusting perpendicularity and concentricity using space in the bearing itself. As a result, the effect of reducing the manufacturing cost and shortening an entire length in the axial direction of a vehicle can be achieved.

DETAILED DESCRIPTION

Figure 1:
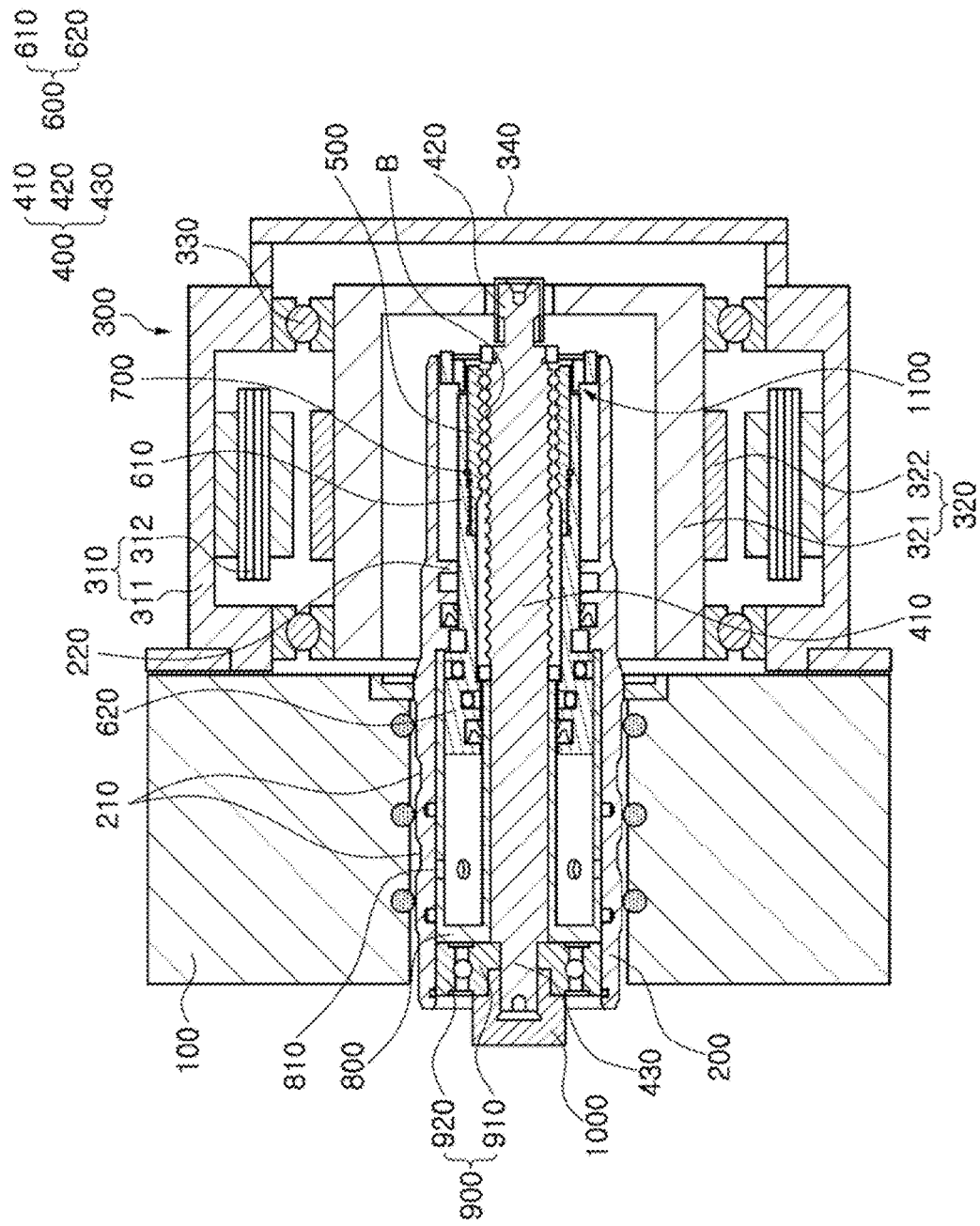
FIG. 1 is a cross-sectional view illustrating a vehicle brake apparatus according to an embodiment of the present disclosure.

A vehicle brake apparatus according to an embodiment of the present disclosure will be described below with reference to the accompanying drawings. For clarity and convenience in description, thicknesses of lines, sizes of constituent elements, and the like may be illustrated in non-exact proportion in the drawings. In addition, a term to be assigned to a constituent element according to the present disclosure is defined considering a function of the constituent element and may vary according to a user's intention or a manager's intention or based on practices in the art. Therefore, the term should be defined in context in light of the present specification.

Figure 2:
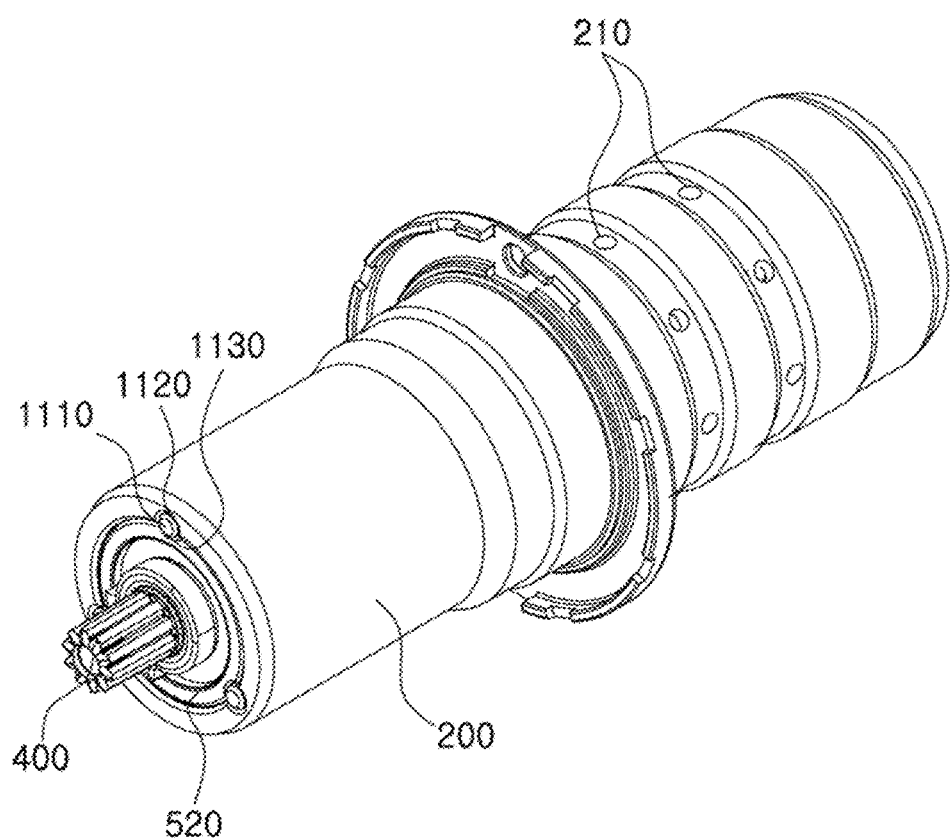
FIG. 2 is a perspective view illustrating a cylinder in the vehicle brake apparatus according to the embodiment of the present disclosure.
Figure 3:
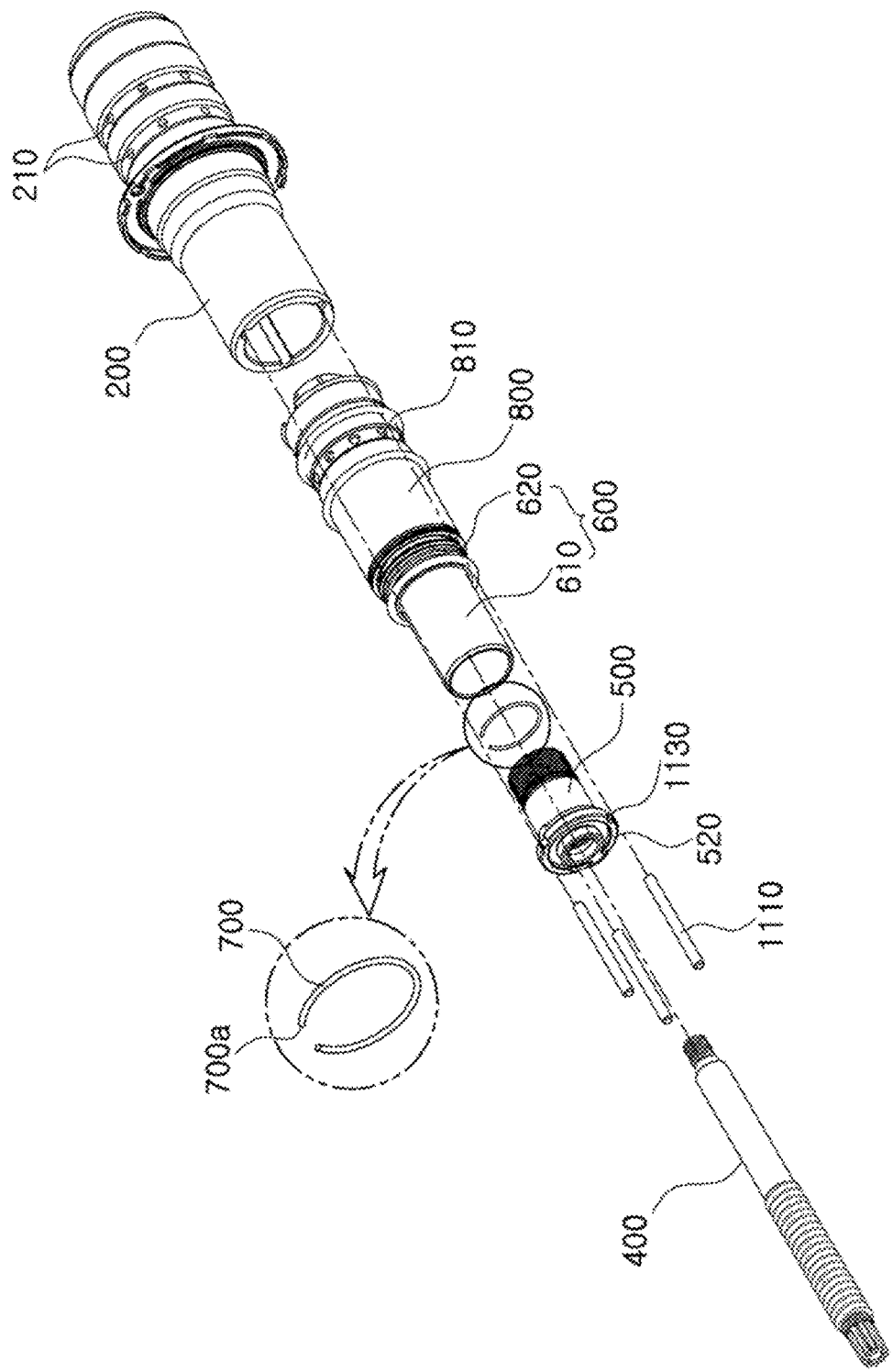
FIG. 3 is an exploded perspective view illustrating the cylinder in FIG. 2.
Figure 4:
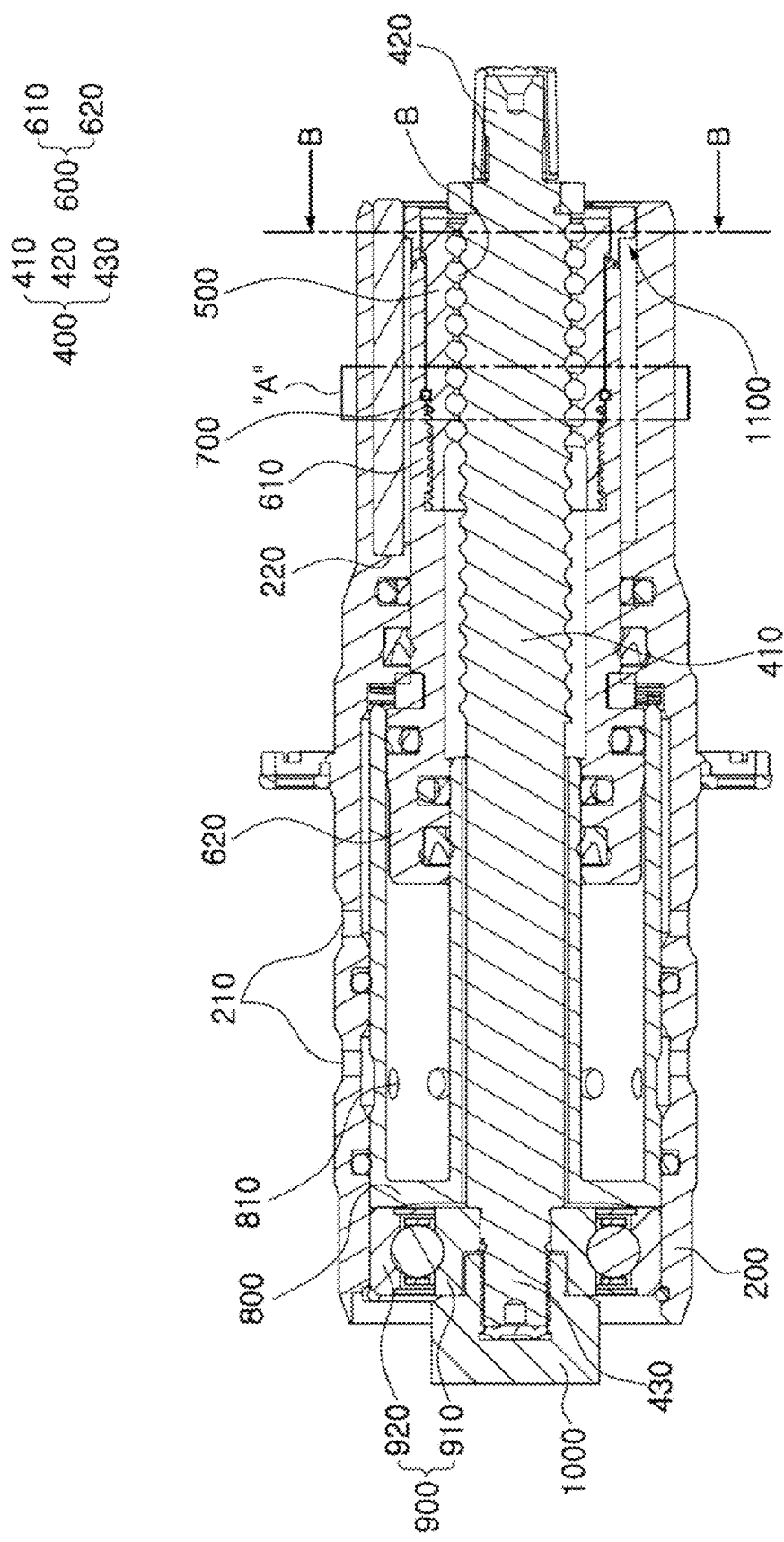
FIG. 4 is a cross-sectional view illustrating the cylinder in FIG. 2.
Figure 5:
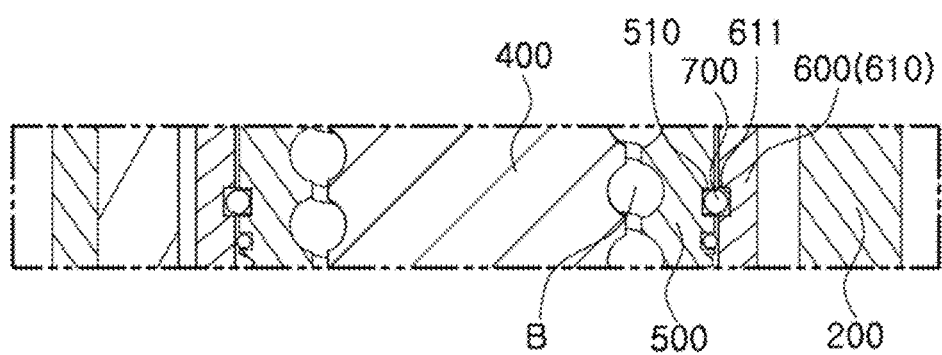
FIG. 5 is an enlarged cross-sectional view illustrating the rectangular portion "A," indicated by a two-dot chain line, of FIG. 4.

FIG. 1 is a cross-sectional view illustrating the vehicle brake apparatus according to the embodiment of the present disclosure. FIG. 2 is a perspective view illustrating a cylinder in the vehicle brake apparatus according to the embodiment of the present disclosure. FIG. 3 is an exploded perspective view illustrating the cylinder in FIG. 2. FIG. 4 is a cross-sectional view illustrating the cylinder in FIG. 2. FIG. 5 is an enlarged cross-sectional view illustrating the rectangular portion "A," indicated by a two-dot chain line, of FIG. 4.

With reference to FIGS. 1 to 5, the vehicle brake apparatus according to the embodiment of the present disclosure may include a housing 100, a cylinder 200, a motor 300, a screw shaft 400, a nut 500, a piston 600, and a retaining portion 700.

The housing 100 has an internal space inside and is positioned outside the cylinder 200 (to the left side when FIG. 1 is viewed from top).

The cylinder 200 is installed in the housing 100 by being pressed thereinto and withstands torque that is generated when hydraulic pressure is generated due to a reciprocating movement of the piston 600. The cylinder 200 is assembled into the housing 100 in such a manner that concentricity thereof is regulated.

The vehicle brake apparatus according to the embodiment of the present disclosure may further include a sleeve 800. The cylinder 200 is formed in such a manner as to have a hollow shape. The sleeve 800 may be provided in a one-side portion (to the left-side when FIG. 1 is viewed from top) of the space inside the cylinder 200. The sleeve 800 has an operating section inside in such a manner that pressing by the piston 600 generates hydraulic pressure.

The sleeve 800 is positioned inside the housing 100 and is provided within the cylinder 200. The sleeve 800 facilitates the movement of the inserted piston 600 by providing guidance. The sleeve 800 is formed in such a manner as to surround a head 620 of the piston 600.

A port 210 through which operating oil flows is formed in an outer surface of the cylinder 200 corresponding the sleeve 800. The ports 210 are provided on both sides, respectively, of the cylinder 200 in the lengthwise direction. The operating oil flows through the port 210 as the piston 600 moves, generating required braking pressure required.

A cut-off hole 810 is formed in an outer surface of the sleeve 800 in a manner that communicates with the port 210. A plurality of cut-off holes 810 may be formed in the sleeve 800 along the circumference thereof. As a result, the operating oil in the sleeve 800 may be discharged in the radial direction of the piston 600.

Various types of drive apparatuses may be used as the motor 300, as long as they realize the technical concept of being connected to the cylinder 200 and supplying rotational motive power thereto. The motor 300 transfers a rotational force (torque) to the screw shaft 400.

The motor 300 may include a stationary unit 310, a motor rotation unit 320, and a motor bearing 330.

The stationary unit 310 may be formed in various shapes, as long as it realizes the technical concept of being fixed to the housing 100 and producing a varying magnetic force when supplied with electric power. The stationary unit 310 may include a stationary frame 311 and a stator 312. The stationary frame 311 is fixed to one side (to the right side when FIG. 1 is viewed from top) of the housing 100. The stator 312 is installed on an inner surface of the stationary frame 311 facing the motor rotation unit 320 and produces the magnetic force.

The stationary frame 311 is connected to one side of the housing 100, and the motor rotation unit 320 is rotatably installed inside the stationary frame 311. In addition, the stator 312 that is an electromagnet is installed on an inner surface of the stationary frame 311 in the circumferential direction thereof. A magnetic flux of the stator 312 varies with a control signal of a control unit (not illustrated), thereby rotating the motor rotation unit 320.

The shape of the motor rotation unit 320 can be varied, as long as it realizes the technical concept of being connected to the screw shaft 400 and rotating in unison with the screw shaft 400, but in response to a change in a magnetic force of the stationary unit 310.

The motor rotation unit 320 may include a rotational frame 321 and a rotor 322. The rotational frame 321 is rotatably installed inside the stationary frame 311 in a manner that surrounds one side (the right side when FIG. 1 is viewed from top) of the cylinder 200. The rotor 322 is installed on an outer surface of the rotational frame 321 that faces the stationary unit 310 and rotates in response to the magnetic force.

The motor rotation unit 320 may be formed in such a manner as to have an approximately "C"-shaped cross section and to have a hollow shape.

The motor bearing 330 is installed between the stationary unit 310 and the motor rotation unit 320 and reduces friction that occurs when the motor rotation unit 320 rotates. The rotor 322 that is a plurality of magnets installed on the rotational frame 321 in the circumferential direction thereof rotates in unison with the rotational frame 321, in response to a change in the magnetic force produced by the stator 312.

A cover member 340 that is fixed to the stationary frame 311 is installed in a manner that surrounds the outside of an end portion of the rotational frame 321 and blocks introduction of a foreign material.

The screw shaft 400 is provided inside the cylinder 200. The screw shaft 400 is inserted into the cylinder 200 in the lengthwise direction thereof and is shaft-connected to the cylinder 200. The cylinder 200 is concentric to the screw shaft 400.

The screw shaft 400 may include a body 410, a first coupling unit 420, and a second coupling unit 430. The screw shaft 400 is fixed to a bearing 900 described below with the support 1000.

The body 410 externally threaded in the lengthwise direction of the screw shaft 400 is rotatably installed inside the cylinder 200. The body 410 is positioned inside the rotational frame 321 provided on the motor 300.

The first coupling unit 420 extends from an outer surface of one end (the right side when FIG. 1 is viewed from top) of the center-of-rotation portion of the body 410 and has a smaller diameter than the body 410. A spline is formed on an outer surface of the first coupling unit 420 along the circumferential direction of the first coupling unit 420 which faces the rotational frame 321. As a result, the rotational frame 321 and the screw shaft 400 are spline-coupled to each other. Motive power is transferred from the screw shaft 400 to the rotational frame 321.

The second coupling unit 430 extends from an outer surface of the other end of (the left side when FIG. 1 is viewed from top) of the center-of-rotation portion of the body 410 and has a smaller diameter than the body 410. The second coupling unit 430 is rotatably coupled to the bearing 900 described below by passing therethrough.

The nut 500 is provided inside the cylinder 200, and thus is positioned inside the rotational frame 321 provided in the motor 300. The nut 500 is coupled to an outer surface of the screw shaft 400 with balls B in between.

The screw shaft 400 is coupled to the nut 500 by passing therethrough. The balls B are provided between the internally threaded inner surface of the nut 500 and the externally threaded outer surface of the body 410, and a rotational motion of the screw shaft 400 may be converted into a linear motion through the nut 500. That is, the nut 500 reciprocates along the axial direction of the screw shaft 400 along the rotational direction of the screw shaft 400.

A flange 520 may be formed on one end portion (the right side when FIG. 1 is viewed from top) of the nut 500 that faces the motor 300. The flange 520 is formed in the circumferential surface of the nut 500 in such a manner as to extend in the lateral direction of the nut 500.

The nut 500 and the flange 520 may be integrally formed into one piece. When the flange 520 is integrally formed with the nut 500 without being separable from the nut 500, the rigidity of the resulting assembly can be enhanced, and the complex assembling of the flange 520 and the nut 500 can be avoided.

The piston 600 is coupled in a manner that surrounds the outside of the nut 500. The piston 600 moves in unison with the nut 500 in the lengthwise direction of the cylinder 200.

The piston 600 may include a rod 610 and the head 620.

The rod 610 is formed in a hollow shape and is positioned inside the rotational frame 321 provided in the motor 300. The nut 500 and the rod 610 are engaged with each other in a nut-and-bolt fastening manner in a state where an outer surface of the nut 500 and an inner surface of the rod 610 come into contact with each other. The head 620 may be integrally formed with the rod 610. The head 620 may be formed in such a manner as to have a greater diameter than the rod 610.

The head 620 is formed in the shape of a ring and is positioned inside the housing 100. The head 620 reciprocates inside the sleeve 800, thereby moving the operating oil inside the sleeve 800 toward the port 210. As a result, the cylinder 200 generates hydraulic pressure for double-acting operation as the piston 600 reciprocates.

The retaining portion 700 may be shaped like a circular or elliptical ring, with the center portion thereof passing through the screw shaft 400 in the axial direction thereof, and may be shaped like a regular polygon with equal sides and angles. The retaining portion 700 has an opening 700a. Furthermore, the retaining portion 700 may be formed in the shape of approximately the letter "C," with one side open. The retaining portion 700 may be manufactured of a metal material, a plastic material, or a rubber material.

The retaining portion 700 may be installed between the nut 500 and the piston 600. A first groove 510 is formed in the nut 500. The first groove 510 is formed by recessing the outer surface of the nut 500. The first groove 510 is formed in the nut 500 along the circumferential direction thereof. One part of the retaining portion 700 is accommodated inside the first groove 510. Furthermore, the inside of the retaining portion 700 is accommodated in the first groove 510.

A second groove 611 that corresponds to the first groove 510 is formed in the piston 600. The second groove 611 is formed by recessing the inner surface of the rod 610. The second groove 611 is formed in the piston 600 along the circumferential direction thereof. The remaining parts of the retaining portion 700 are accommodated inside the second groove 611. Furthermore, the outside of the retaining portion 700 is accommodated in the second groove 611.

The retaining portion 700 serves to inhibit relative motion in the axial direction between the nut 500 and the piston 600 in such a manner that relative motion does not occur between the nut 500 and the piston 600. Moreover, the retaining portion 700 serves to prevent the coupling between the nut 500 and the piston 600 from being loosened in the direction opposite to the direction of tightening the nut 500 and the piston 600 that are engaged with each other in a nut-and-bolt fastening manner.

The retaining portion 700 may be elastically transformed. Furthermore, when the piston 600 is coupled to the nut 500 in a nut-and-bolt fastening manner, the opening 700a in the retaining portion 700 is narrowed, and thus the retaining portion 700 is shrank. When the coupling is finished, the retaining portion 700 is elastically restored to the original shape thereof. As a result, the retaining portion 700 is accommodated between the first groove 510 and the second groove 611 and is seated between the nut 500 and the rod 610.

The vehicle brake apparatus according to the embodiment of the present disclosure may further include the bearing 900. The bearing 900 is positioned inside the housing 100 and is provided inside an end portion of the cylinder 200. The bearing 900 and the sleeve 800 are installed in a state where one outer surface of the bearing 900 and one outer surface of the sleeve 800 are brought into contact with each other. The bearing 900 is coupled to the screw shaft 400 in a manner that surrounds the second coupling unit 430 of the screw shaft 400.

The bearing 900 is installed in a state where an inner bearing portion 910 thereof is brought into contact with the second coupling unit 430 of the screw shaft 400 and where an outer bearing portion 920 thereof is brought into contact with an inner surface of the cylinder 200. The bearing 900 supports an axial load when the piston 600 reciprocating along the axial direction of the screw shaft 400 generates hydraulic pressure inside the cylinder 200.

The vehicle brake apparatus according to the embodiment of the present disclosure may further include the support 1000. The support 1000 is provided inside the cylinder 200. An end portion of the second coupling unit 430 is accommodated inside the support 1000. The bearing 900 is fixed to an outer circumferential surface of an opening in the support 1000. The support 1000 rotatably supports the screw shaft 400.

The vehicle brake apparatus according to the embodiment of the present disclosure may further include a guide unit 1100. The guide unit 1100 is provided inside the cylinder 200. The guide unit 1100 serves to restrict rotation of the nut 500 and to guide linear movement of the nut 500.

The guide unit 1100 restricts the rotation of the nut 500 and guides movement thereof in such a manner that the nut 500 that is moved along the screw shaft 400 by the forward and reverse rotations of the screw shaft is not rotated in the rotational direction of the screw shaft 400. Thus, the guide unit 1100 causes the nut 500 to be moved along the axial direction of the screw shaft 400.

Figure 6:
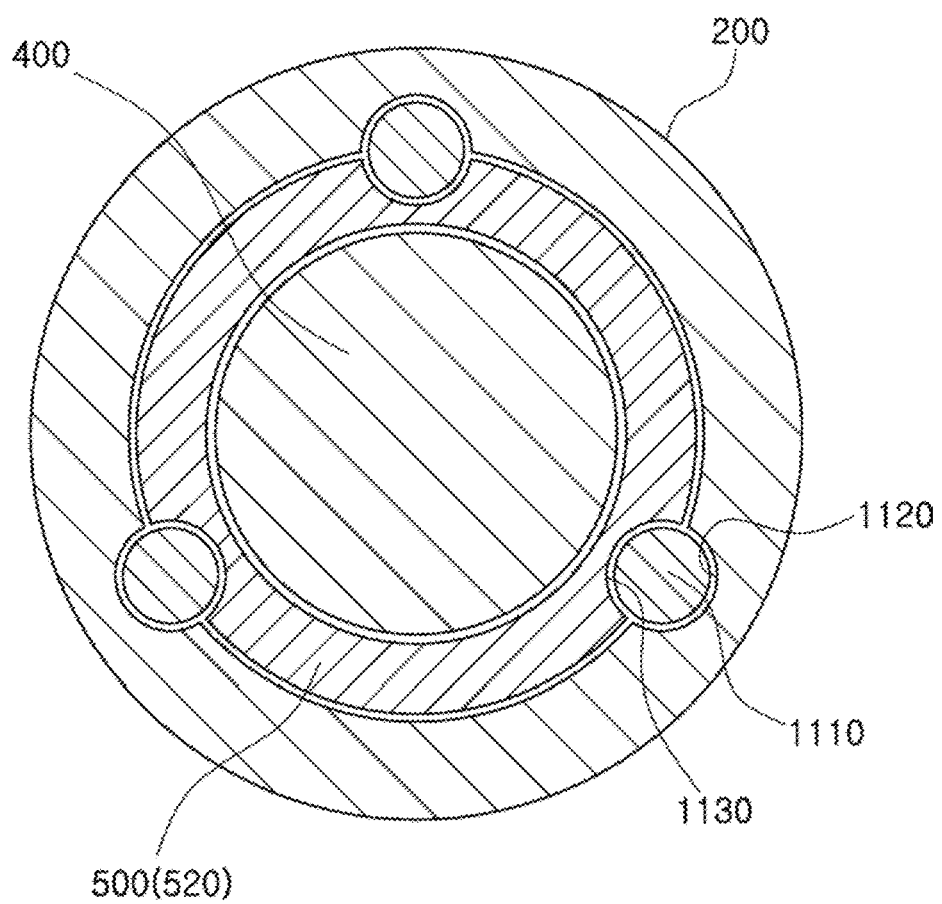
FIG. 6 is a cross-sectional view taken along line B-B on FIG. 4 that is referred to for description of a first implementation example of a guide unit of the vehicle brake apparatus according to the embodiment of the present disclosure.

FIG. 6 is a cross-sectional view taken along line B-B on FIG. 4 that is referred to for description of a first implementation example of the guide unit 1100 of the vehicle brake apparatus according to the embodiment of the present disclosure.

With reference to FIG. 6, the guide unit 1100 may include a guide member 1110 that is inserted between the cylinder 200 and the nut 500 and guides the linear movement of the nut 500 by restricting the rotation of the nut 500.

The guide member 1110 may be in the shape of a rod with a predetermined length, a cross section thereof being circular or elliptical or may be in the shape of a bar with a predetermined length, a cross section thereof being polygonal.

A plurality of guide members 1110 may be arranged to be spaced apart in the circumferential direction of the cylinder 200. Assuming the same layout is applicable, the length of stroke required to generate braking fluid pressure may increase significantly when the guide member 1110 is formed to a predetermined length compared to when the guide member 1110 is not formed accordingly.

A first guide groove 1120 may be formed in the inner surface of the cylinder 200 by recessing the inner surface thereof. A second guide groove 1130 may be formed in the outer surface of the nut 500 by recessing the outer surface thereof, in such a manner as to corresponding to the first guide groove 1120.

The first guide groove 1120 and the second guide groove 1130 may be formed to a predetermined length in the lengthwise direction of the cylinder 200 that corresponds to the length of the guide member 1110. A plurality of first guide grooves 1120 may be arranged to be spaced apart in the circumferential direction of the cylinder 200. A plurality of second guide grooves 1130 may be arranged to be spaced apart in the circumferential direction of the cylinder 200.

The guide member 1110 is positioned between the first guide groove 1120 and the second guide groove 1130, and the nut 500 moves in a straight line along the guide member 1110.

A support protrusion 220 supporting one end portion of the guide member 1110 may be formed on the inner surface of the cylinder 200. The support protrusion 220 may be protrusively formed on the inner surface of the cylinder 200. The support protrusion 220 may be formed on one end portion of the first guide groove 1120.

As another implementation example, the second guide groove 1130 may be formed in an outer surface of the flange 520 by recessing the outer surface thereof, in such a manner to correspond to the first guide groove 1120. As a result, the flange 520 moves in a straight line along the guide member 1110.

Furthermore, the guide member 1110 restricts rotation of the flange 520 integrally formed with the nut 500 and guides movement of the flange 520 in such a manner that the nut 500 that moves along the screw shaft 400 by the forward and reverse rotations of the screw shaft 400. Thus, the nut 500 moves in a straight line along the axial direction of the screw shaft 400.

Figure 7:
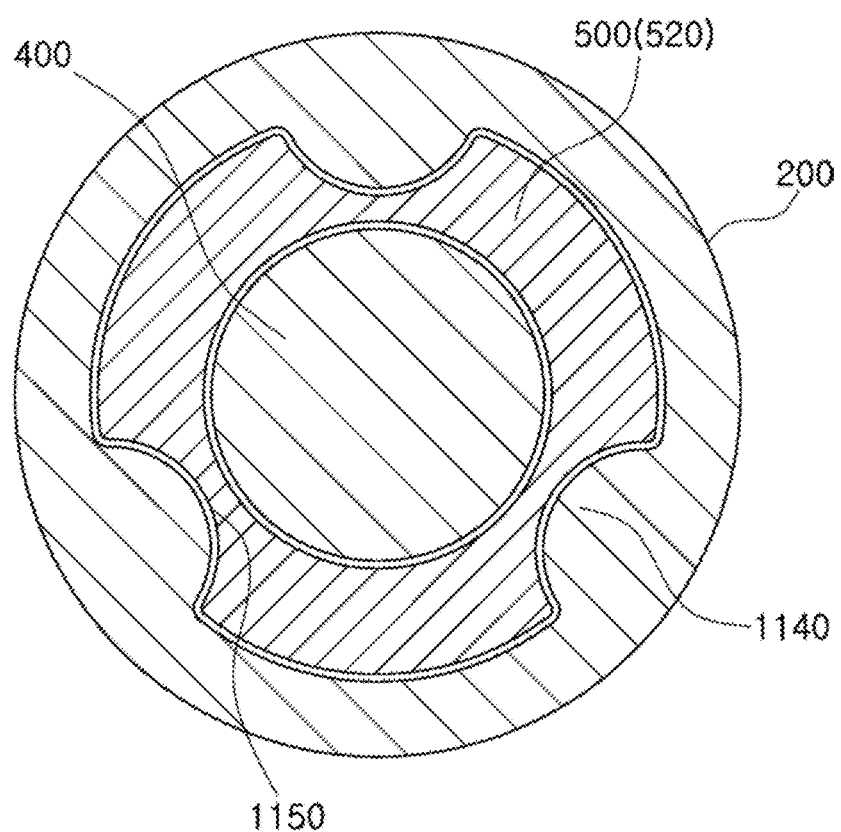
FIG. 7 is a cross-sectional view taken along line B-B on FIG. 4 that is referred to for description of a second implementation example of the guide unit of the vehicle brake apparatus according to the embodiment of the present disclosure.

FIG. 7 is a cross-sectional view taken along line B-B on FIG. 4 that is referred to for description of a second implementation example of the guide unit 1100 of the vehicle brake apparatus according to the embodiment of the present disclosure.

With reference to FIG. 7, the guide unit 1100 may be integrally formed with the cylinder 200 or the nut 500. Furthermore, the guide unit 1100 may be formed by machining the inner surface of the cylinder 200 or may be formed by machining the outer surface of the nut 500.

The guide unit 1100 may include a first guide protrusion 1140 and a third guide groove 1150. The first guide protrusion 1140 is protrusively formed on the inner surface of the cylinder 200. The third guide groove 1150 is formed in the outer surface of the nut 500 by recessing the outer surface of the nut 500, in such a manner as to correspond to the first guide protrusion 1140.

A plurality of first guide protrusions 1140 may be arranged to be spaced apart in the circumferential direction of the cylinder 200. A plurality of third guide grooves 1150 may be arranged to be spaced apart in the circumferential direction of the cylinder 200. The first guide protrusion 1140 and the third guide groove 1150 may each be formed to a predetermined length in the lengthwise direction of the cylinder 200. As a result, the nut 500 moves in a straight along the first guide protrusion 1140.

As an implementation example, the third guide groove 1150 may be formed on the outer surface of the flange 520 by recessing the outer surface thereof, in such a manner to correspond to the first guide protrusion 1140. As a result, the flange 520 moves in a straight line along the first guide protrusion 1140.

Figure 8:
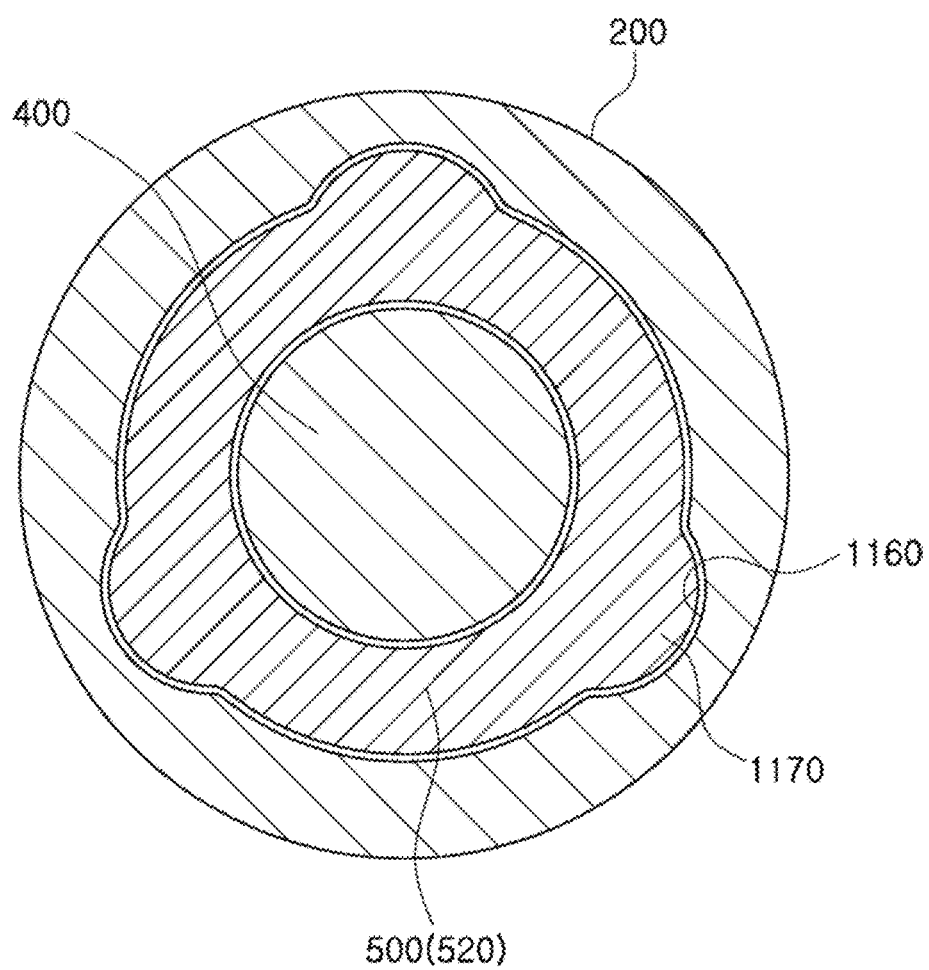
FIG. 8 is a cross-sectional view taken along line B-B on FIG. 4 that is referred to for description of a third implementation example of the guide unit of the vehicle brake apparatus according to the embodiment of the present disclosure.

FIG. 8 is a cross-sectional view taken along line B-B on FIG. 4 that is referred to for description of a third implementation example of the guide unit 1100 of the vehicle brake apparatus according to the embodiment of the present disclosure.

With reference to FIG. 8, the guide unit 1100 may be integrally formed with the cylinder 200 or the nut 500. Furthermore, the guide unit 1100 may be formed by machining the inner surface of the cylinder 200 or may be formed by machining the outer surface of the nut 500.

The guide unit 1100 may include a fourth guide groove 1160 and a second guide protrusion 1170. The fourth guide groove 1160 is formed in the inner surface of the cylinder 200 by recessing the inner surface thereof. The second guide protrusion 1170 is protrusively formed on the outer surface of the nut 500 in such a manner as to correspond to the fourth guide groove 1160.

A plurality of fourth guide grooves 1160 may be arranged to be spaced apart in the circumferential direction of the cylinder 200. A plurality of second guide protrusions 1170 may be arranged to be spaced apart in the circumferential direction of the cylinder 200. The fourth guide groove 1160 and the second guide protrusion 1170 may each be formed to a predetermined determined length in the lengthwise direction of the cylinder 200. As a result, the nut 500 moves in a straight line along the fourth guide groove 1160.

As another implementation example, the second guide protrusion 1170 may be protrusively formed on the outer surface of the flange 520 in such a manner as to correspond to the fourth guide groove 1160. As a result, the flange 520 moves in a straight line along with the fourth guide groove 1160.

Operation of the vehicle brake apparatus with the above-described configuration according to the embodiment of the present disclosure that is configured as described above is described as follows.

With reference to FIGS. 1 to 5, when the piston 600 moves forward inside the cylinder 200, the screw shaft 400 coupled to the motor 300 and provided with the rotational force of the motor 300 axially rotates in one direction inside the cylinder 200, and the nut 500 moves along the screw shaft 400 toward the sleeve 800.

The rotation of the nut 500 in one direction is restricted by the guide unit 1100, and the movement of the nut 500 is guided by the guide unit 1100. Thus, nut 500 moves in a straight line in the axial direction of the screw shaft 400 without rotating.

Assuming the same layout is applicable, the length of stroke required to generate the braking fluid pressure may increase significantly when the guide unit 1100 is formed to a predetermined length toward the lengthwise direction of the cylinder 200 compared with when the guide unit 1100 is not formed accordingly.

As a result, when the nut 500 moves toward the sleeve 800, the piston 600 coupled to the nut 500 generates the braking fluid pressure while moving forward in a straight line inside the cylinder 200 in unison with the nut 500.

With reference to FIGS. 1 to 5, when the piston 600 moves backward inside the cylinder 200, the screw shaft 400 that axially rotates inside the cylinder 200 rotates in the reverse direction, and the nut 500 moves along the screw shaft 400 toward the direction that is opposite to the direction of the sleeve 800.

The reverse rotation of the nut 500 is restricted, and the movement of the nut 500 is guided by the guide unit 1100. Thus, the nut 500 moves in a straight line in the axial direction of the screw shaft 400 without rotating.

Assuming the same layout is applicable, the length of stroke required to generate the braking fluid pressure may increase significantly when the guide unit 1100 is formed to a predetermined length toward the lengthwise direction of the cylinder 200 compared with when the guide unit 1110 is not formed accordingly.

That is, when the nut 500 moves toward the direction that is opposite to the direction of the sleeve 800, the piston 600 coupled to the nut 500 generates the braking fluid pressure while moving forward in a straight line inside the cylinder 200 in unison with the nut 500. As a result, the hydraulic pressure for double-acting operation is generated as the piston 600 reciprocates in a straight line inside the cylinder 200.

Figure 9:
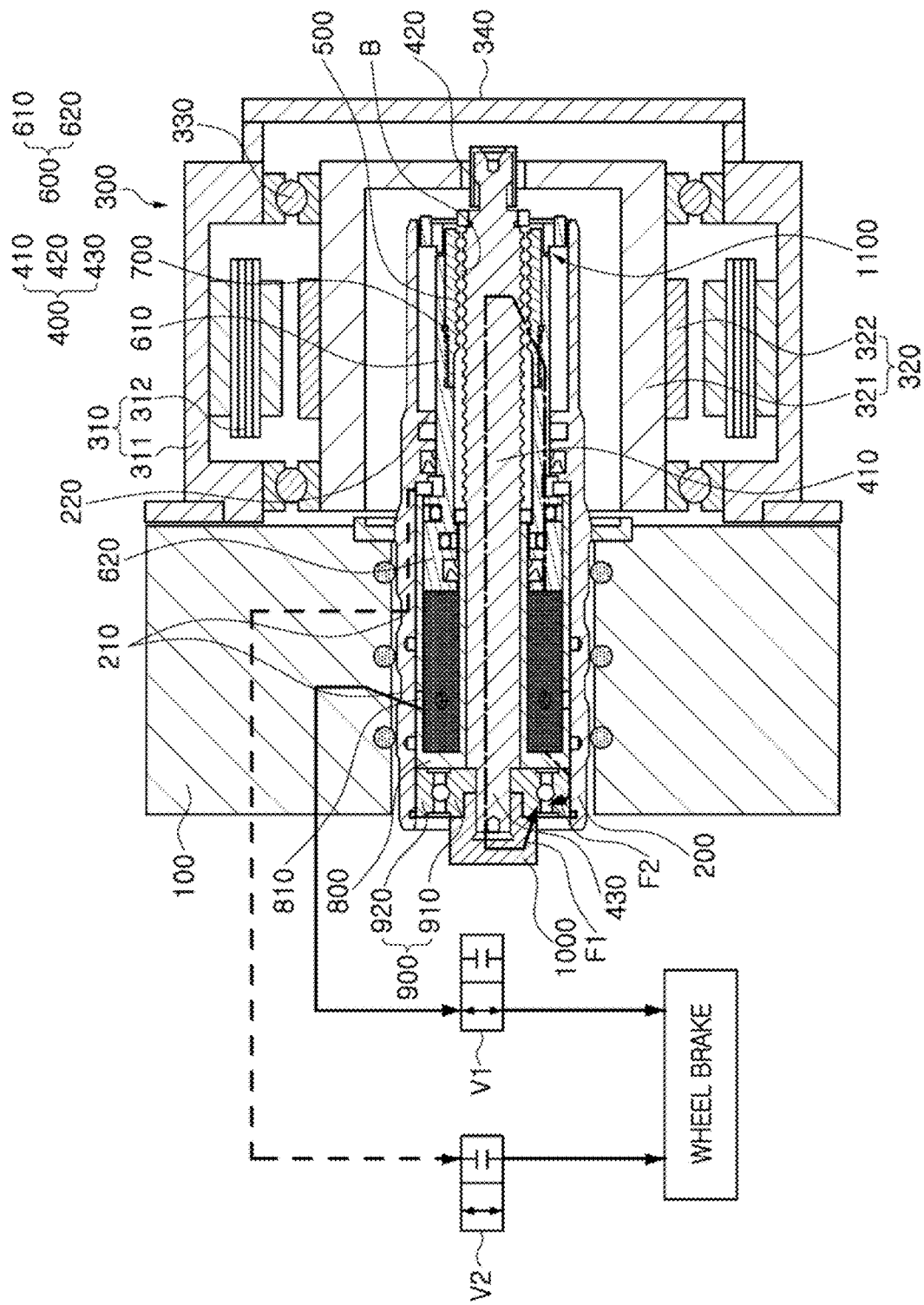
FIG. 9 is a cross-sectional view illustrating the vehicle brake apparatus according to the embodiment of the present disclosure, the view showing a state where hydraulic pressure is generated on one side of a head of a piston.

FIG. 9 is a cross-sectional view illustrating the vehicle brake apparatus according to the embodiment of the present disclosure, the view showing a state where hydraulic pressure is generated on one side of the head 620 of the piston 600.

With reference to FIG. 9, a first value V1 coupled to the port 210 provided in one side of the cylinder 200 is open, and a second valve V2 coupled to the port 210 provided in the other side of the cylinder 200 is closed. In this state, hydraulic pressure is generated on one side (the left side when FIG. 9 is viewed from top) of the head 620 of the piston 600 and transferred to a wheel brake.

Pressure generated by the hydraulic pressure causes a reaction force that moves the head 620 to the other side (the right side when FIG. 9 is viewed from top) of the cylinder 200. The reaction force is transferred to the head 620, the rod 610, the nut 500, the body 410, the second coupling unit 430, the support 1000, and the inner bearing portion 910 in this order. Thus, a first force F1 is generated. A load produced by the hydraulic pressure is transferred to the sleeve 800 and the outer bearing portion 920 in this order. Thus, a second force F2 is generated.

At this point, an area on which the first force F1 is exerted due to the hydraulic pressure and an area on which the second force F2 is exerted due to the hydraulic pressure are the same (F1=F2). As a result, the axial load that results from generating the hydraulic pressure causes a force equilibrium between the inner bearing portion 910 and the outer bearing portion 920 of the bearing 900 inside the cylinder 200. As a result, because the axial load is not transmitted to the outside, the axial load is not applied to the motor 300.

Figure 10:
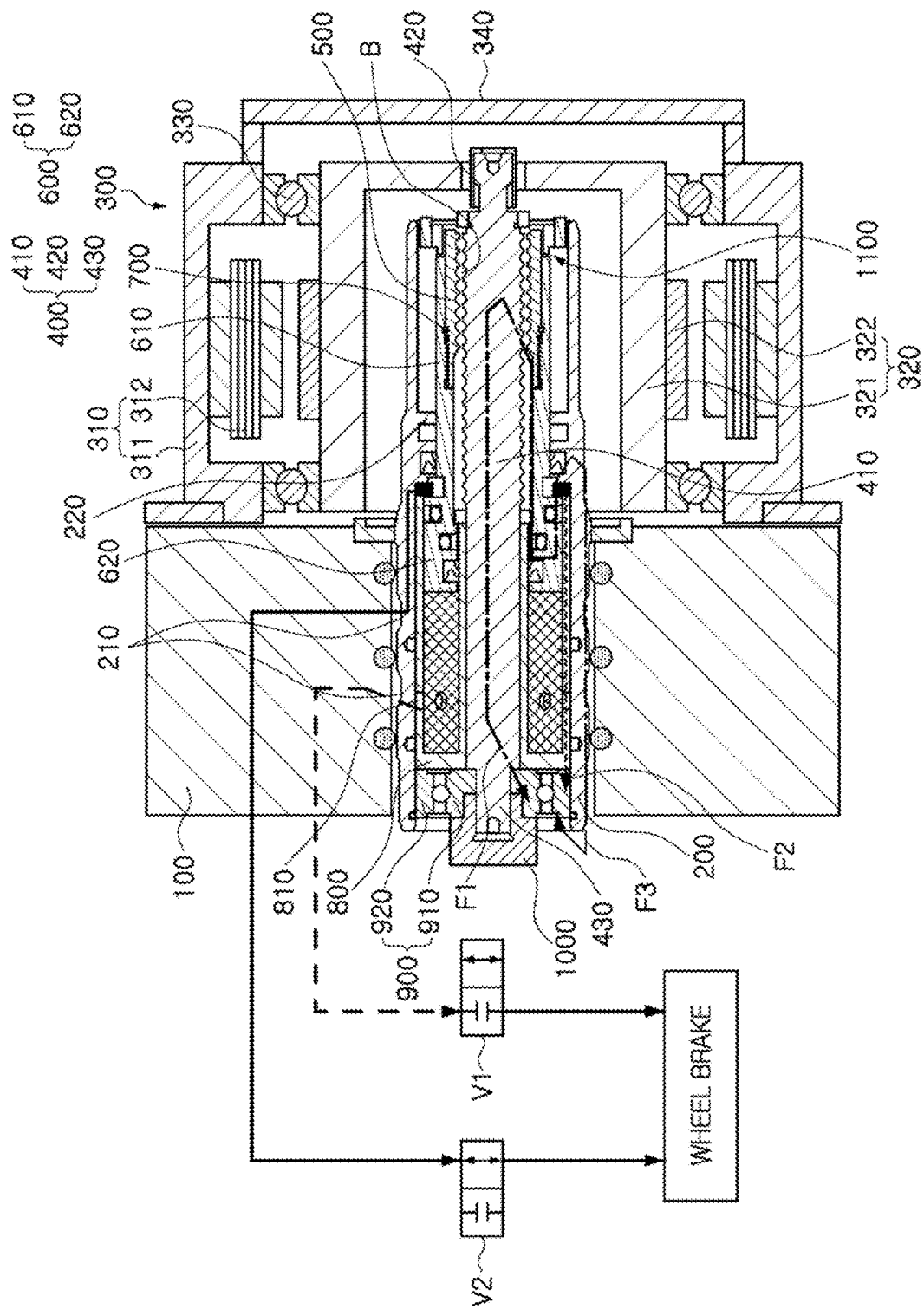
FIG. 10 is a cross-sectional view illustrating the vehicle brake apparatus according to the embodiment of the present disclosure, the view showing a state where hydraulic pressure is generated on the other side of the head of the piston.

FIG. 10 is a cross-sectional view illustrating the vehicle brake apparatus according to the embodiment of the present disclosure, the view showing a state where hydraulic pressure is generated on the other side of the head 620 of the piston 600.

With reference to FIG. 10, the first value V1 coupled to the port 210 provided in one side of the cylinder 200 is closed, and the second valve V2 coupled to the port 210 provided in the other side of the cylinder 200 is open. In this state, hydraulic pressure is generated on the other side (the right side when FIG. 10 is viewed from top) of the head 620 of the piston 600 and transferred to the wheel brake.

Pressure generated by the hydraulic pressure causes a reaction force that moves the head 620 to one side (the left side when FIG. 10 is viewed from top) of the cylinder 200. The reaction force is transferred to the head 620, the rod 610, the nut 500, the body 410, and the inner bearing portion 910 in this order. Thus, the first force F1 is generated. Moreover, the reaction force is transferred to the sleeve 800 and the outer bearing portion 920 in this order. Thus, the second force F2 is generated. A load produced by the hydraulic pressure is transferred to the cylinder 200 and the outer bearing portion 920 in this order. Thus, a third force F3 is generated.

At this point, the sum of the area on which the first force F1 is exerted due to the hydraulic pressure and the area on which the second force F2 is exerted due to the hydraulic pressure is the same as an area on which the third force F3 is exerted due to the hydraulic pressure (F1+F2=F3). As a result, the axial load that results from generating the hydraulic pressure causes the force equilibrium between the inner bearing portion 910 and the outer bearing portion 920 of the bearing 900 inside the cylinder 200. As a result, because the axial load is not transmitted to the outside, the axial load is not applied to the motor 300.

Figure 11:
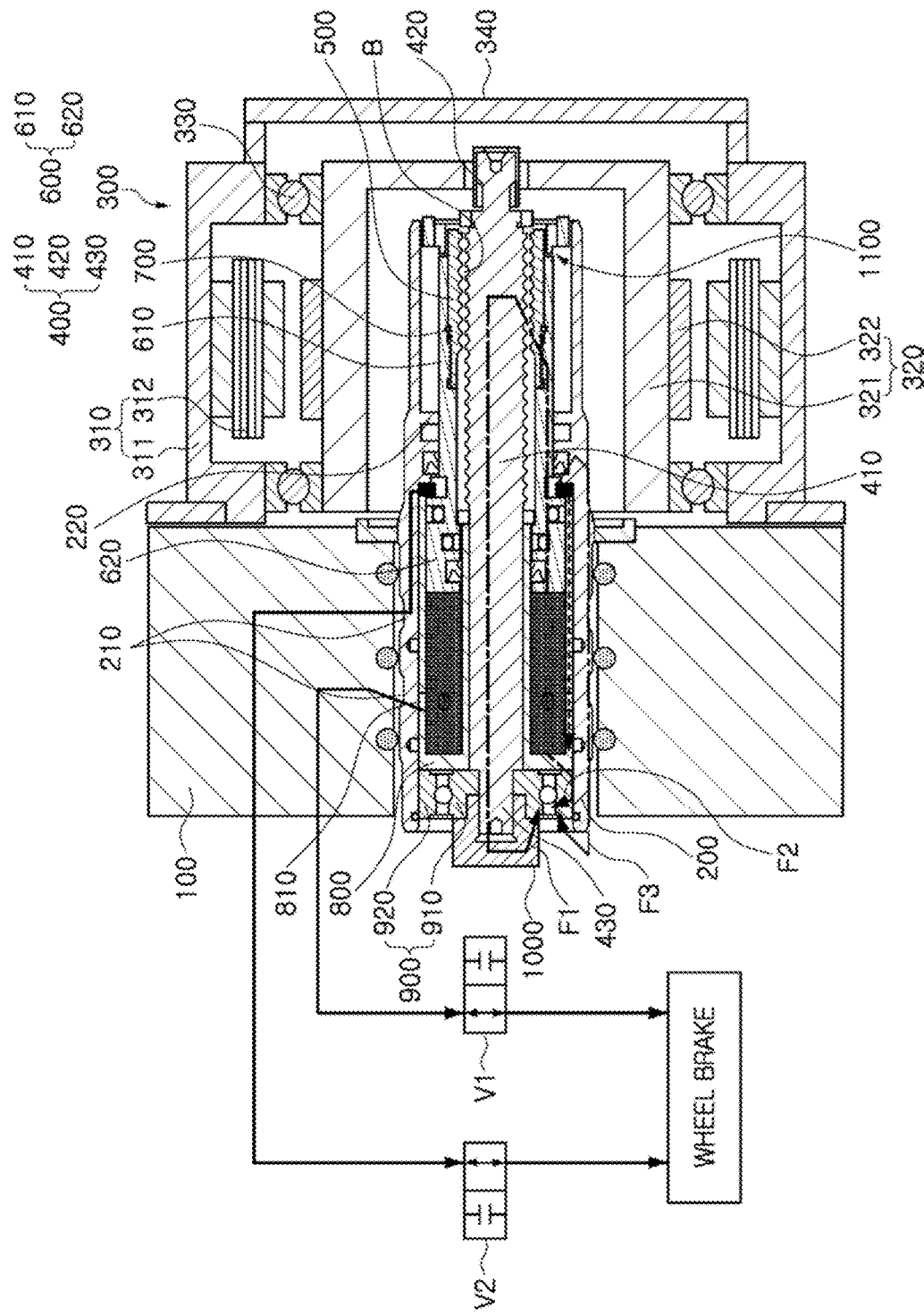
FIG. 11 is a cross-sectional view illustrating the vehicle brake apparatus according to the embodiment of the present disclosure, the view showing a state where hydraulic pressure is generated on both sides of the head of the piston.

FIG. 11 is a cross-sectional view illustrating the vehicle brake apparatus according to the embodiment of the present disclosure, the view showing a state where hydraulic pressure is generated on both sides of the head 620 of the piston 600.

With reference to FIG. 11, the first value V1 coupled to the port 210 provided in one side of the cylinder 200 is open, and the second valve V2 coupled to the port 210 provided in the other side of the cylinder 200 is open. In this state, hydraulic pressure is generated on both sides of head 620 of the piston 600 and transferred to the wheel brake.

Pressure generated by the hydraulic pressure present in the sleeve 800 positioned on one side (the left side when FIG. 11 is viewed from top) of the head 620 causes a reaction force that moves the head 620 to the other side (the right side when FIG. 11 is viewed from top) of the cylinder 200. The reaction force is transferred to the head 620, the rod 610, the nut 500, the body 410, the second coupling unit 430, the support 1000, and the inner bearing portion 910 in this order. Thus, the first force F1 is generated. Pressure generated by the hydraulic pressure present in the sleeve 800 positioned on the other side (the right side when FIG. 11 is viewed from top) of the head 620 causes a reaction force that moves the head 620 to one side (the left side when FIG. 11 is viewed from top) of the cylinder 200. The reaction force is transferred to the cylinder 200 and the outer bearing portion 920 in this order. Thus, the third force F3 is generated.

The load produced by the hydraulic pressure is transferred to the sleeve 800 and the outer bearing portion 920 in this order. Thus, the second force F2 is generated.

At this point, the sum of the area on which the first force F1 is exerted due to the hydraulic pressure and the area on which the third force F3 is exerted due to the hydraulic pressure are the same as the area on which the second force F2 is exerted due to the hydraulic pressure (F1+F3=F2). As a result, the axial load that results from generating the hydraulic pressure causes the force equilibrium between the inner bearing portion 910 and the outer bearing portion 920 of the bearing 900 inside the cylinder 200. As a result, because the axial load is not transmitted to the outside, the axial load is not applied to the motor 300.

With the configuration of the retaining portion 700 installed between the nut 500 and the piston 600, the vehicle brake apparatus according to the present disclosure may prevent the coupling of the nut 500 and the piston 600 in a nut-and-bolt fastening manner from being loosened.

With the configuration of the guide unit 1100 that restricts the rotation of the nut 500 moving along the screw shaft 400 and guides the linear movement of the nut 500, the vehicle brake apparatus according to the embodiment of the present disclosure may convert the rotational motion of the screw shaft 400 into a straight-line motion of the piston 600 and may reduce a manufacturing cost and improve NVH performance.

The vehicle brake apparatus according to the present disclosure may bidirectionally support the axial load that is produced due to the reaction force resulting from generating the hydraulic pressure, through the bearing 900 coupled to the cylinder 200, and thus the axial load that is produced by the hydraulic pressure is not transferred to the motor 300.

In the vehicle brake apparatus according to the present disclosure, the motor 300 does not support the axial load. As a result, the weight and size of both of the housing 100 and the bearing 900 can be reduced.

The vehicle brake apparatus according to the present disclosure can adjust perpendicularity and concentricity using space in the bearing 900 itself. Thus, an existing single component for assembling in an axially manner can be omitted and an entire length in the axial direction of a vehicle can be shortened.

The embodiment of the present disclosure is described only in an exemplary manner with reference to the drawings. It would be understandable by a person of ordinary skill in the art to which the present disclosure pertains that various modifications may possibly be made to the embodiment and that various equivalents thereof may possibly be implemented. Therefore, the proper technical scope of the present disclosure should be defined by the following claims.

What is claimed is:

1. A vehicle brake apparatus comprising:
    a housing;
    a cylinder installed inside the housing and enclosing a screw shaft;
    a motor connected to the cylinder and configured to provide a rotational force to the screw shaft;
    a nut coupled to the screw shaft with a ball member between the nut and the screw shaft, wherein the nut is configured to reciprocate along an axial direction of the screw shaft in a manner that corresponds to a rotational direction of the screw shaft;
    a piston coupled to the nut and configured to move in unison with the nut; and
    a retaining portion, installed between the nut and the piston, and having an opening therein,
    wherein:
    the retaining portion is a ring comprised of an elastic material, and
    the opening is located at a position in the elastic material of the ring so that the opening will narrow and the ring will shrink when the piston is coupled to the nut in a nut-and-bolt fastening manner.

2. The vehicle brake apparatus of claim 1, further comprising:
    a sleeve provided inside the cylinder and configured to guide movement of the piston into the sleeve.

3. The vehicle brake apparatus of claim 2, wherein a port, configured to allow operating oil to flow therethrough, is formed in an outer surface of the cylinder, and
    wherein a cut-off hole that communicates with the port is formed in an outer surface of the sleeve.

4. The vehicle brake apparatus of claim 3, wherein the cylinder is configured to generate hydraulic pressure for a double-acting operation as the piston reciprocates.

5. The vehicle brake apparatus of claim 3, wherein the piston comprises:
    a rod coupled to an outer surface of the nut in the nut-and-bolt fastening manner; and
    a head integrally formed with the rod and configured to longitudinally reciprocate inside the sleeve,
    wherein the retaining portion is located between a a groove of the nut and a groove of the rod of the piston.

6. The vehicle brake apparatus of claim 1, further comprising:
    a bearing provided inside the cylinder, coupled to the screw shaft, and configured to support an axial load when hydraulic pressure is generated inside the cylinder.

7. The vehicle brake apparatus of claim 6, wherein the motor comprises:
    a stationary unit fixed to the housing and configured to produce a varying magnetic force when supplied with electric power;
    a motor rotation unit connected to the screw shaft and configured to rotate in unison with the screw shaft in response to a change in the magnetic force produced by the stationary unit; and
    a motor bearing, installed between the stationary unit and the motor rotation unit, and configured to reduce friction that occurs when the motor rotation unit rotates.

8. The vehicle brake apparatus of claim 7, wherein the motor rotation unit comprises:
    a rotational frame rotatably installed inside the stationary unit to surround one side of the cylinder; and
    a rotor installed on an outer surface of the rotational frame that faces the stationary unit and is configured to rotate in response to the magnetic force.

9. The vehicle brake apparatus of claim 8, wherein the screw shaft comprises:
    a body rotatably installed inside the cylinder, an outer surface of the body being externally threaded;
    a first coupling unit extending from one side of the body and spline-coupled to the rotational frame; and
    a second coupling unit extending from another side of the body and rotatably coupled to the bearing.

10. The vehicle brake apparatus of claim 1, wherein the retaining portion is in a shape of a letter C, with ene side open.

11. The vehicle brake apparatus of claim 10, wherein a first groove is formed in an outer surface of the nut by recessing the outer surface thereof, in such a manner as to accommodate one part of the retaining portion, and
    wherein a second groove is formed in an inner surface of the piston by recessing the inner surface thereof in such a manner as to correspond to the first groove and to accommodate remaining parts of the retaining portion.

12. The vehicle brake apparatus of claim 1, further comprising:
    a guide provided inside the cylinder, configured to restrict rotation of the nut and guide linear movement of the nut.

13. The vehicle brake apparatus of claim 12, wherein the guide comprises:
    a guide member located between the cylinder and the nut.

14. The vehicle brake apparatus of claim 13, wherein the guide comprises:
    a first guide groove formed in an inner surface of the cylinder by recessing the inner surface thereof; and
    a second guide groove formed in an outer surface of the nut in such a manner as to correspond to the first guide groove,
    wherein the guide member is positioned between the first guide groove and the second guide groove.

15. The vehicle brake apparatus of claim 14, further comprising:
a support protrusion protrusively formed on the inner surface of the cylinder and supporting one end portion of the guide member,
wherein the support protrusion is positioned on one end portion of the first guide groove.

16. The vehicle brake apparatus of claim 14, further comprising:
a flange provided on a one end of the nut,
wherein the second guide groove is formed through the flange, and
wherein the flange is configured to move linearly along the guide member.

17. The vehicle brake apparatus of claim 16, wherein the nut and the flange are integrally formed.

18. The vehicle brake apparatus of claim 13, wherein the guide is integrally formed with the cylinder or the nut.

19. The vehicle brake apparatus of claim 18, wherein the guide comprises:
the guide member comprising a first guide protrusion protrusively formed on an inner surface of the cylinder; and
a third guide groove formed in an outer surface of the nut by recessing the outer surface thereof in such a manner as to correspond to the first guide protrusion, and
wherein the nut is movable linearly along the first guide protrusion.

20. The vehicle brake apparatus of claim 18, wherein the guide comprises:
a fourth guide groove formed in an inner surface of the cylinder by recessing the inner surface thereof; and
the guide member comprising a second guide protrusion protrusively formed on an outer surface of the nut in such a manner as to correspond to the fourth guide groove, and wherein the nut is movable linearly along the fourth guide groove.

* * * * *